United States Patent

[11] 3,599,806

| [72] | Inventor | Raymond C. Fishcher<br>Hinsdale, Ill. |
|---|---|---|
| [21] | Appl. No. | 882,728 |
| [22] | Filed | Dec. 4, 1969<br>Division of Ser. No. 710,284, Mar. 4, 1968,<br>Pat. No. 3,528,564. |
| [45] | Patented | Aug. 17, 1971 |
| [73] | Assignee | International Harvester Company<br>Chicago, Ill. |

[54] BALE WAGON
8 Claims, 13 Drawing Figs.

[52] U.S. Cl. .................................................... 214/6 B
[51] Int. Cl. ........................................................ B65g 57/32
[50] Field of Search ........................................... 214/6 B, 6
P, 518, 519, 520, 521, 522; 100/100

[56] References Cited
UNITED STATES PATENTS

| 3,159,287 | 12/1964 | Stroup | 214/6 B |
| 3,367,518 | 2/1968 | Bishop | 214/6 B |
| 3,402,832 | 9/1968 | Wehde | 214/6 B |
| 3,443,699 | 5/1969 | Lundahl | 214/6 B |
| 3,450,033 | 6/1969 | Bornzin | 214/6 B X |
| 3,487,955 | 1/1970 | Brown | 214/6 B |

*Primary Examiner*—Gerald M. Forlenza
*Assistant Examiner*—Robert J. Spar
*Attorney*—Noel G. Artman ABSTRACT: A bale wagon adapted for use in combination with a baler and having three platforms cooperatively arranged for (1) receiving bales discharged from the baler, (2) accumulating and rearranging the bales to form a horizontal layer, and (3) accumulating a series of layers to form a load of bales. The bale wagon includes a bale pusher assembly which may be selectively actuated to form a layer having bales arranged in an interlocked relation with bales of an adjacent layer.

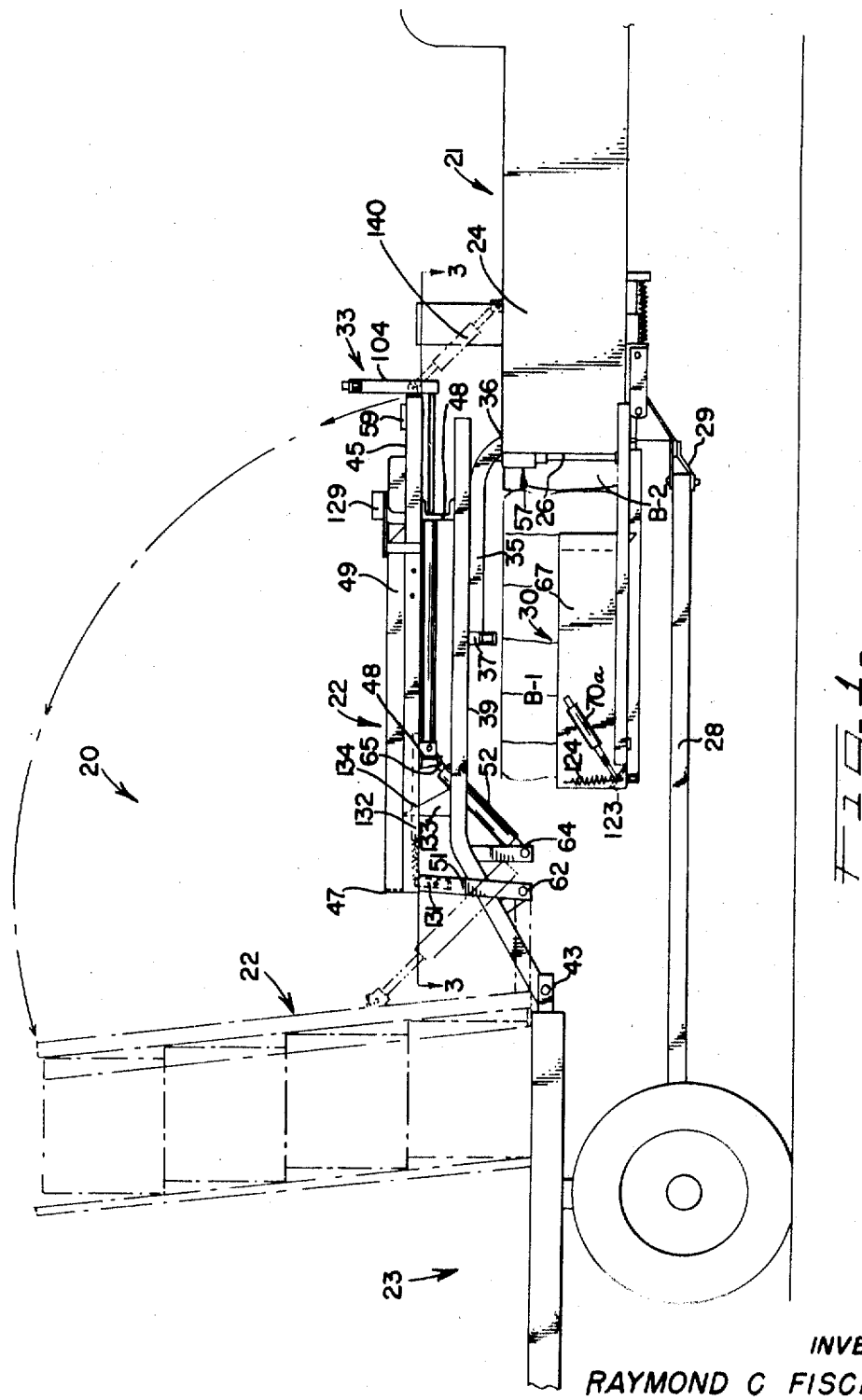

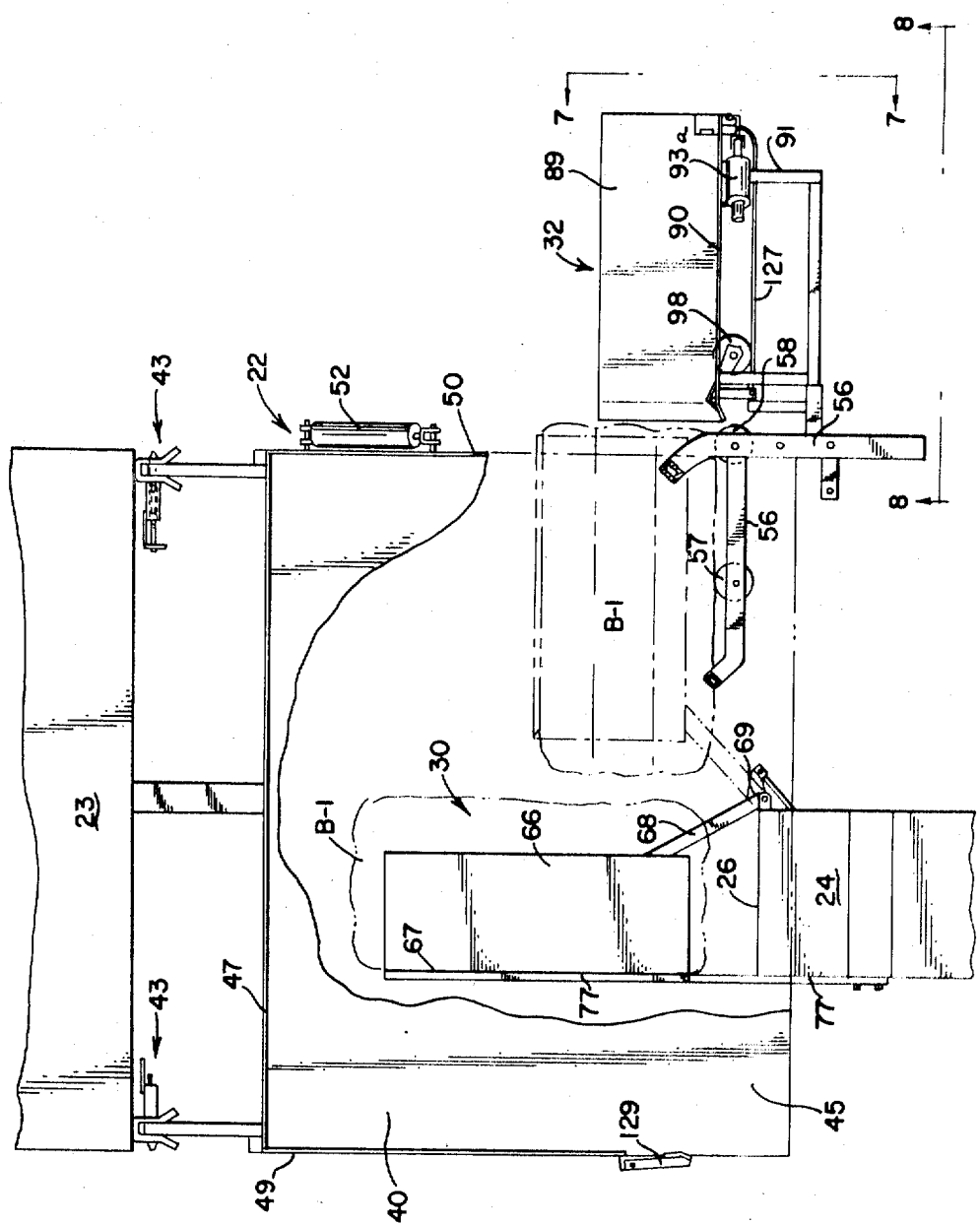

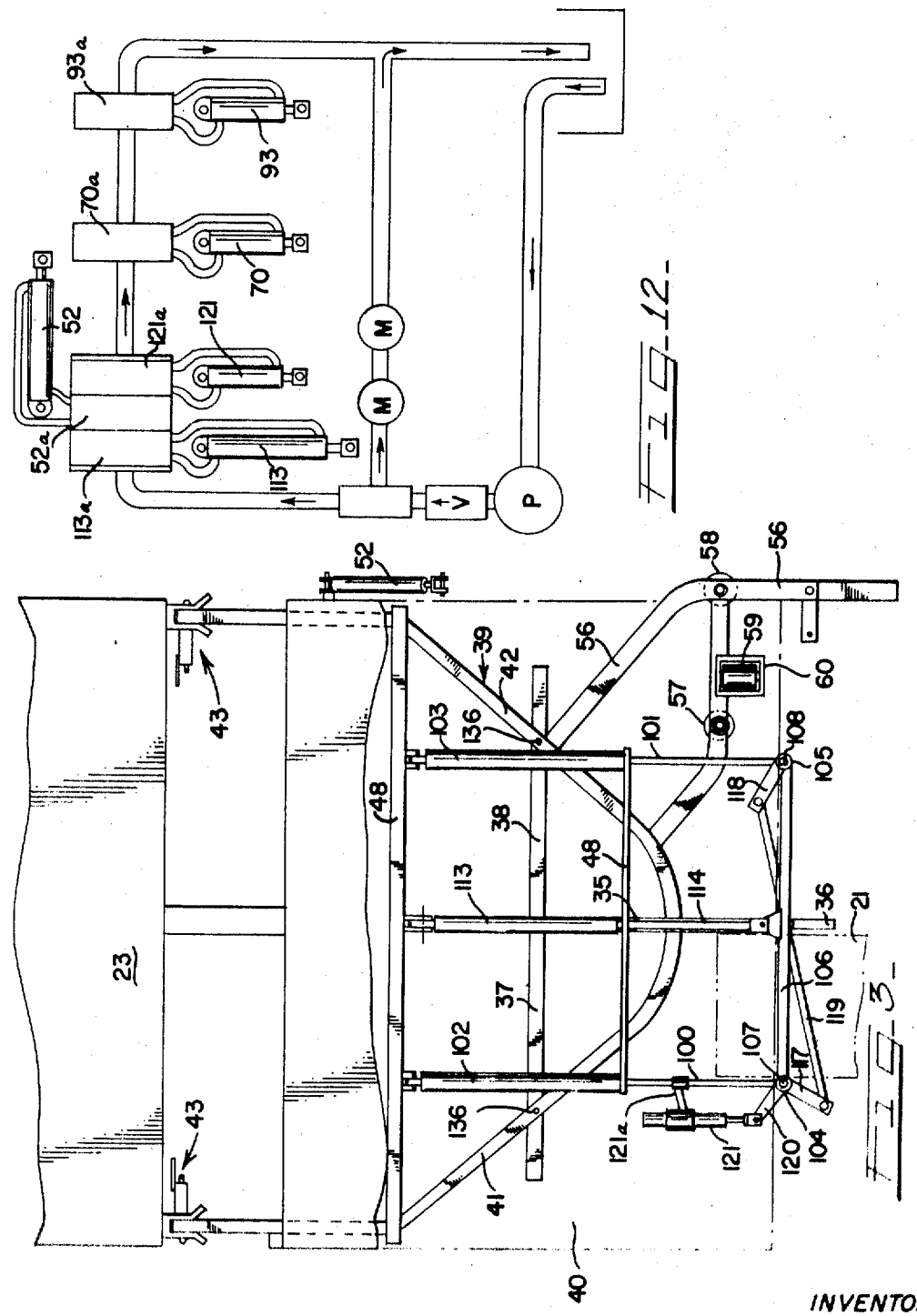

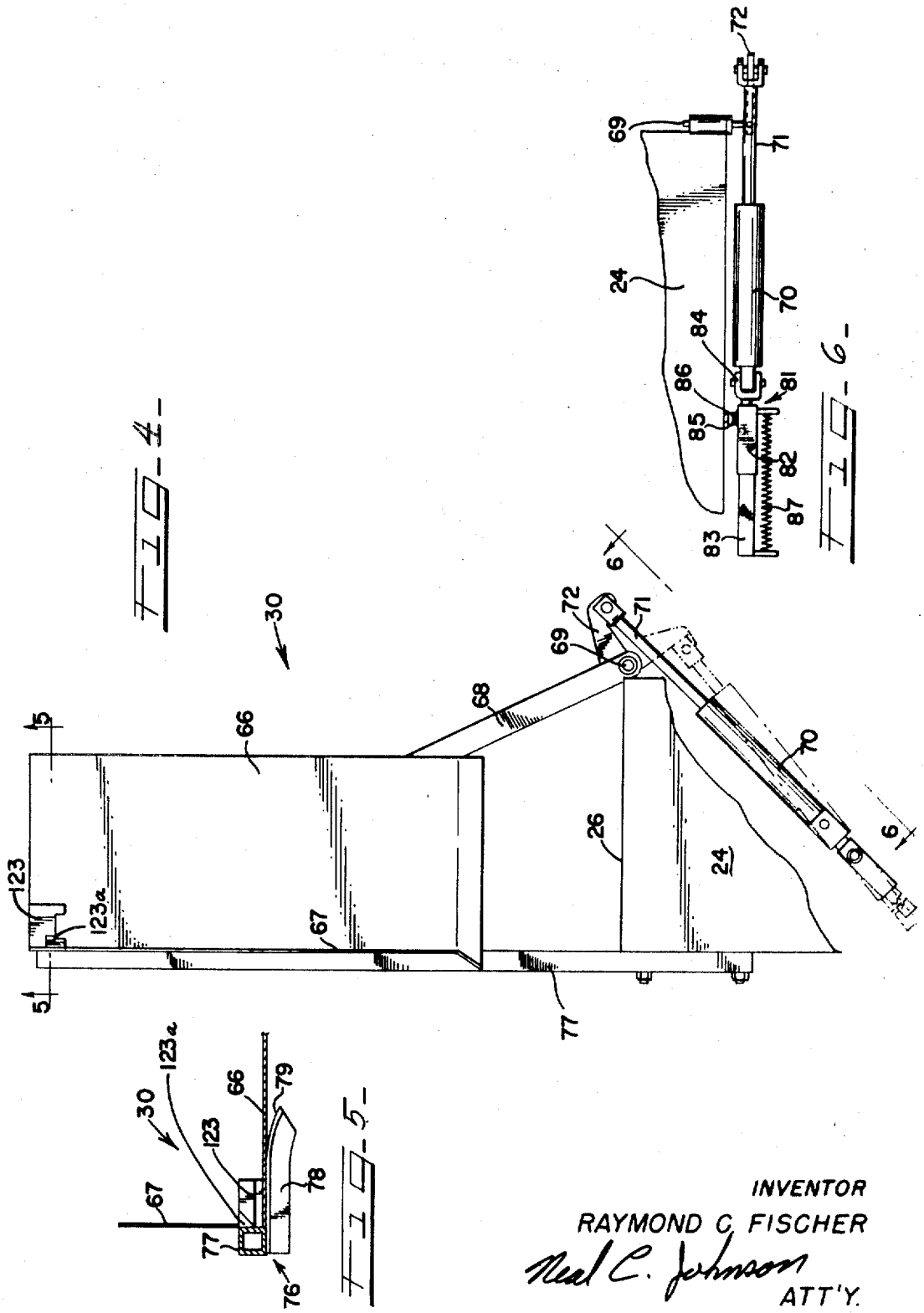

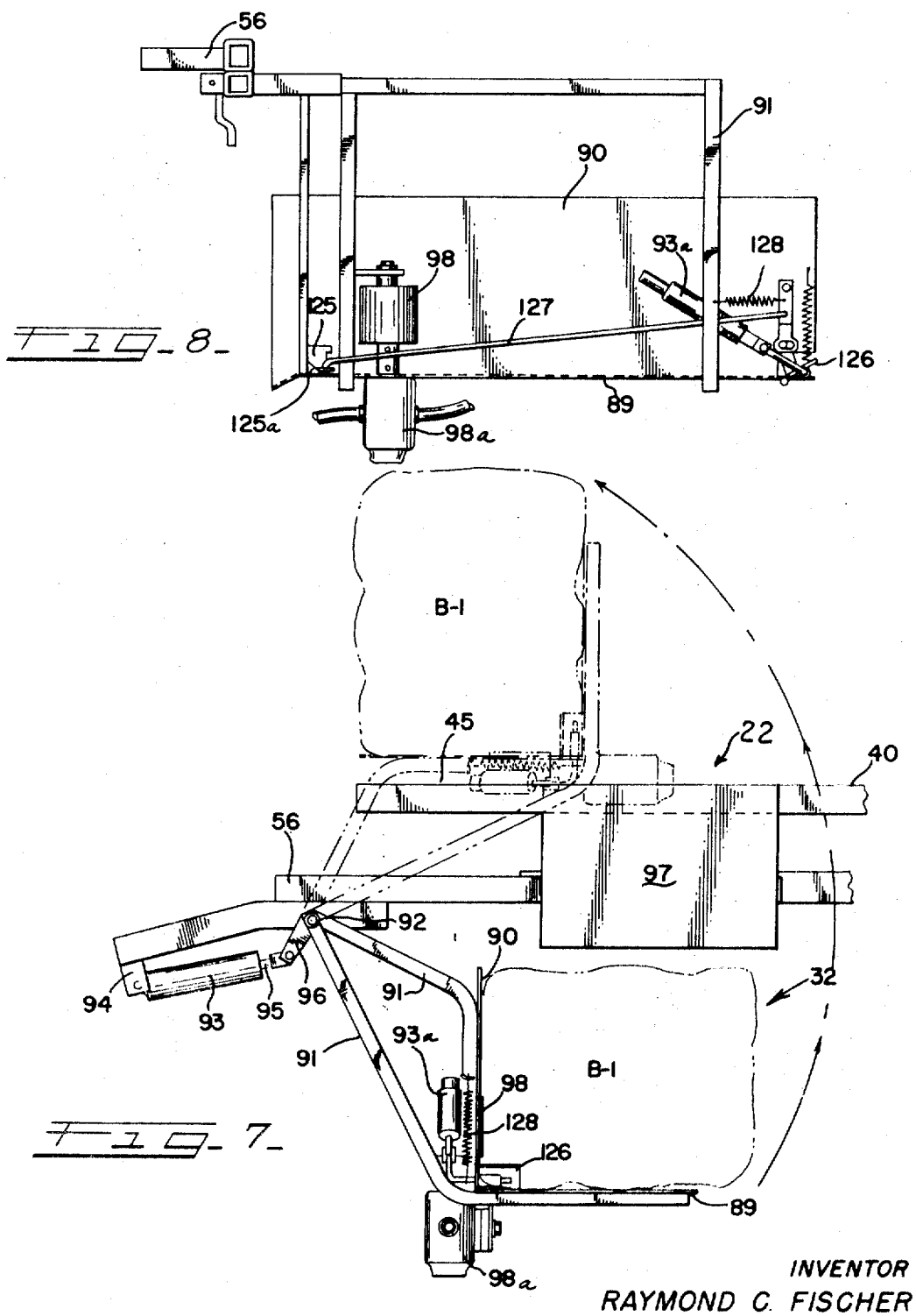

INVENTOR
RAYMOND C. FISCHER

Neal C. Johnson ATT'Y.

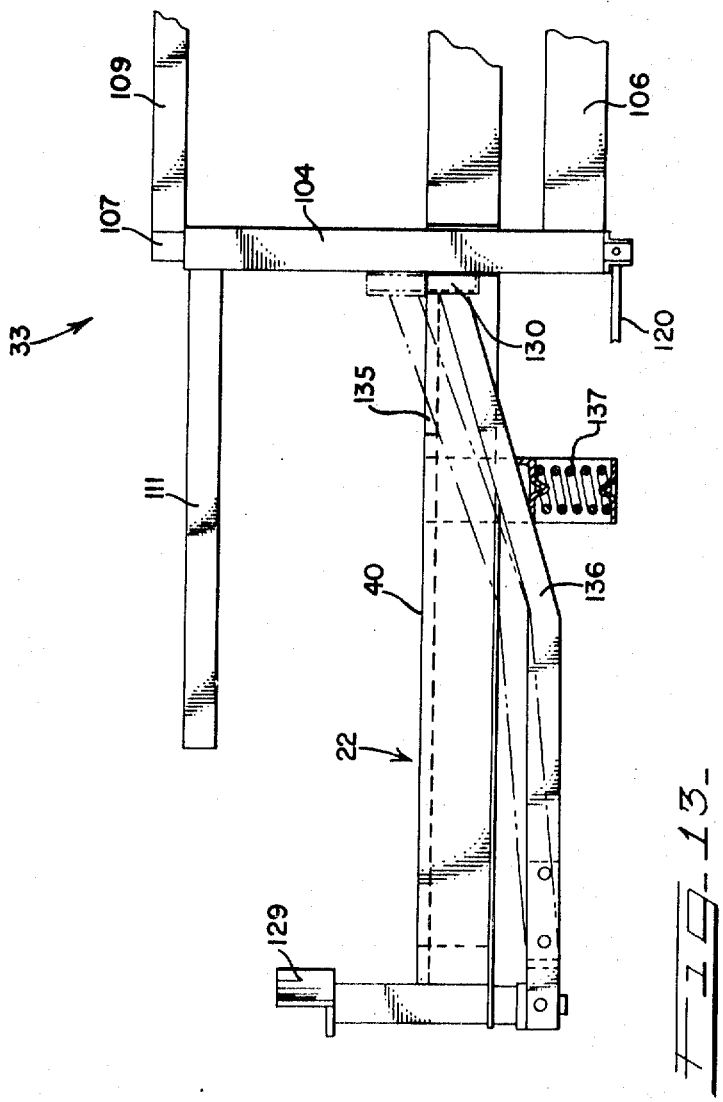

3,599,806

BALE WAGON

This application is a division of applicant's copending application Ser. No. 710,284 filed Mar. 4, 1968, now Pat. No. 3,528,569.

BACKGROUND AND SUMMARY OF THE INVENTION

The present invention in general relates to the bale-handling art and more specifically to a bale wagon adapted to cooperate with a baler for mechanically accumulating bales discharged from the baler.

The combination of a baler and a bale wagon produces a unit capable of performing two separate and distinct hay handling functions: form the bale and accumulate the bales. The accumulation function contemplates that the bales are ground deposited at the delivery point. This requires that the bale wagon be equipped with mechanical means for stacking bales to form a compact load and be sufficiently mobile to haul the load long distances.

The present invention provides for a bale wagon having a transport unit detachable from its associated loading facilities which are mounted on the baler. In addition to producing a highly maneuverable transport unit, this particular arrangement permits continuous baling operation by alternating two transport units with one baler and its loading facility attachment.

The loading facilities comprise a table permanently mounted on the baler and connection means for joining the transport unit therewith. Bale transfer means receives and delivers bales individually to the table which accumulates the bales into a layer according to a predetermined pattern. The pattern may be varied so that the final ground-deposited stack comprising a series of layers is constructed with the bales crosstied with each other. The crosstieing arrangement, because of the interlocking relationship of the individual bales, produces a highly stable stack.

The table, while supported by the baler, is cooperably arranged with the transport unit and is operable to deliver each completed layer thereto. Upon accumulating a load of bales the transport unit is disconnected from the loading facilities and driven under separate power to the storage area. An alternate transport unit may then be connected to the baler attachment so that the baling and accumulation operation may be continued during the transport of the first load.

An object of this invention is to provide a bale wagon cooperable with a baler to mechanically accumulate a load of bales.

Another object is to provide a bale wagon operable to automatically form a stack of bales constructed in an interlocked pattern.

A further object is to provide an attachment for a baler, the attachment being capable of accumulating a layer of bales.

A still further object is to provide a bale wagon having a transport unit detachable from its associated loading facilities.

Another object is to provide a baler attachment cooperable with a transport unit, the transport unit being capable of independent operation during transport.

These and other objects of this invention will become apparent to those skilled in the art from the following disclosure taken in connection with the accompanying drawings.

DRAWINGS

FIG. 1 is a side elevational view of the bale wagon shown connected at the rear of a conventional baler;

FIG. 2 is a plan view of the layer-forming table with portions cut away for convenience of illustration;

FIG. 3 is a sectional view of the layer-forming table taken generally along line 3—3 of FIG. 1;

FIG. 4 illustrates the bale transfer platform and its associated hydraulic cylinder;

FIG. 5 is a sectional view of the bale transfer platform and taken generally along line 5—5 of FIG. 4;

FIG. 6 is a fragmentary view of a rear portion of the baler illustrating the manner in which the transfer cylinder is secured to the baler;

FIG. 7 is an end view of the elevating platform shown in FIG. 2.

FIG. 8 is a fragmentary end view taken generally along line 8—8 of FIG. 2 and illustrating the elevating platform;

Figure 9:
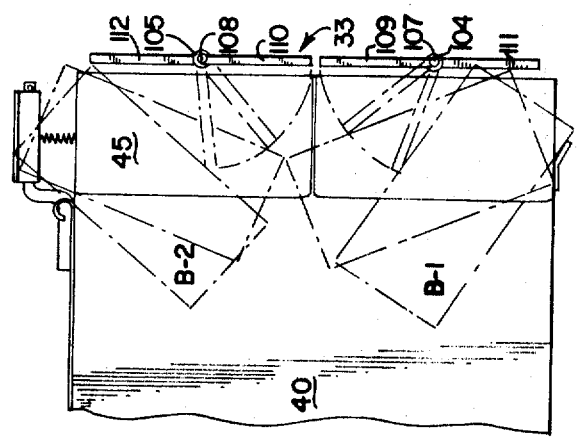
Figure 10:
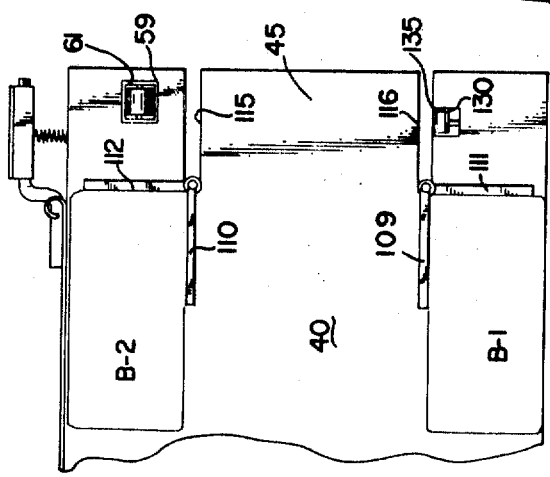
Figure 11:
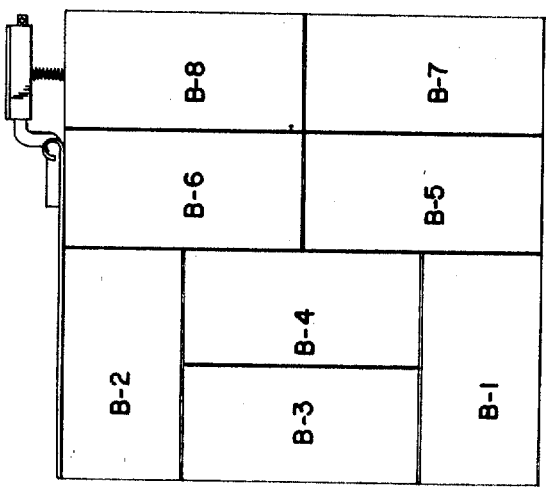

FIGS. 9, 10, and 11 are plan views of the layer-forming table showing sequential operation of the pusher assembly and table with a completed layer;

FIG. 12 is a diagrammatic presentation of the hydraulic system used to operate the various components of the bale wagon;

FIG. 13 is an enlarged fragmentary view illustrating the auxiliary trip lever and the bale pusher assembly.

DESCRIPTION OF THE PREFERRED EMBODIMENT

With reference to FIGS. 1 and 2, a bale wagon 20 is seen cooperatively arranged with a conventional baler 21 which includes a bale chamber 24 having a rearwardly facing bale discharge 26. The bale wagon 20 includes two distinct but interrelated components—a layer-forming table 22 and a wheel-mounted transport unit 23. The table 22 is positioned in relation to the bale discharge 26 to receive bales individually delivered by transfer means which includes a bale-receiving platform 30, and an elevating platform 32. A bale pusher assembly 33 mounted on the table 22 operates to rearrange bales thereon to form a horizontal layer. With a completed layer, the table 22 is then pivoted to a generally vertical position wherein the horizontal layer is deposited on the transport unit 23 in the form of a vertical tier.

A wagon tongue 28 having its forward end pinned to a clevis 29 attached to the baler 21 provides the means for towing the transport unit 23 behind the baler. Power may be supplied by either the baler itself or by a tractor used to tow the baler. After a load of bales has been accumulated, the transport unit 23 is disconnected from the table 22 and the baler 21, and towed to the central storage area. Thus, the table 22 may be considered either as a component of the mechanically operated bale wagon 20 or as an attachment for the baler 21. The components of the bale wagon 20 will be described under the following functional headings: layer-forming table 22, receiving platform 30, elevating platform 32, pusher assembly 33, and controls.

Layer-Forming Table 22 (FIGS. 1, 2, and 3)

A T-shaped member 35 has an upright portion 36 bolted to the bale chamber 24 and presents a pair of laterally extending and axially aligned arms 37 and 38. The member 35 provides the support for the table 22 which includes a frame 39 and a rectangular platform 40. The frame 39 is in the form of a U having a pair of rearwardly diverging legs 41 and 42. The ends of the legs 41 and 42 are pinned to the transport unit 23 by means of spring-loaded connectors shown generally at 43, 43. The legs 41 and 42, respectively, rest on arms 37 and 38 so that upon angular movement of the baler 21 with respect to the transport unit 23, the frame 39 and the overlaying platform 40 slide laterally along the supporting arms 37 and 38. This feature is particularly important for it permits the transport unit 23 to be a separate machine towed behind the baler 21. Without the feature providing a table movable laterally relative to the baler, the components would have to be combined in an integral machine which, because of its length, would present maneuverability problems.

Secured to the platform 40 and extending laterally thereacross are a pair of spaced channel members 48, 48. The platform 40, lies generally in a horizontal plane, the elevation of which is above the top of the baling chamber 24. A front portion 45 of the platform 40 is situated directly above the bale chamber discharge 26.

Lateral guide members 49 and 50 flank the platform 40 and a rear guide member 47 interconnects the guide members 49 and 50 enclosing the platform 40 on three sides.

Appended to leg 42 of frame 39 and extending laterally outwardly therefrom is a structure 56 from which depends a pair of roller assemblies 57 and 58. The rollers 57 and 58 are journaled to the structure 56 for rotation about a vertical axis and extend downwardly below the top of the bale chamber discharge 26. As will be described in detail below, the rollers 57 and 58 cooperate with the receiving platform 30 to transfer a bale to the elevating platform 32. The structure 56 also supports a third roller 59 which is rotatably mounted in a bracket 60 for rotation about a horizontal axis. The roller 59 is disposed above the structure 56 and has a peripheral portion projecting through a slot formed in the platform 40. Rollers 57, 58, and 59 are continuously driven by conventional means (not shown) which may comprise a hydraulic motor and belt drive.

As best seen in FIG. 1, the table 22 is supported at its rearwardmost end by a pair of uprights 51. The uprights 51, 51 have their upper ends welded or otherwise securely affixed to the rear corners of the platform 40, and their lower ends pinned to the frame 39 as shown at 62. A hydraulic cylinder 52 anchored to the frame 39 as at 64 and having a piston rod 65 connected to the platform 40, provides the means for tilting the platform 40 about the axis defined by the pin connection 62. The cylinder 52 is actuable to move the platform 40 from an essentially horizontal position to an essentially vertical position wherein the rearward edge defined by guide 47 of the platform 40 is situated adjacent the receiving bed of the transport unit 23.

Receiving Platform 30 (FIGS. 2, 4, 5, and 6)

The receiving platform 30 performs the dual function of receiving a bale discharged from the bale chamber 24 and moving it laterally to a position for delivery to the elevating platform 32. The receiving platform 30 is L-shaped in cross section having a horizontal plate member 66 and an upright wall 67. With the platform 30 in the bale receiving position, the horizontal member 66 is disposed opposite the bale chamber discharge 26, and the upright wall 67 represents a continuation of the left wall of the bale chamber 24 as viewed in FIG. 2.

The receiving platform 30 is mounted on one end of an arm 68 which is hingedly connected to the bale chamber as shown generally at 69. A hydraulic cylinder 70 secured to the underside of the bale chamber 24 has a piston rod 71 connected to a pivot arm 72 integrally formed with arm 68. (See FIGS. 4 and 6).

Retraction of the piston rod 71 pivots the platform 30 about the hinged connection 69 from the bale receiving position (solid line position of FIG. 2) to a bale delivery position (broken line position of FIG. 2).

As illustrated in FIG. 4, the width of the member 66 is slightly less than that of a bale emerging from the bale chamber 24; hence, the overhanging upright portion of a bale carried by the platform 30 abuts the rollers 57 and 58 at spaced points with the platform 30 in the bale delivery position.

It should be noted that the platform 30 is spaced from the bale chamber discharge 26 and that the hinge point 69 is offset from the longitudinal axis of the bale chamber 24. Thus, angular movement of the platform is initially rearward and lateral with respect to the bale chamber discharge 26, thereby precluding interference from a succeeding bale emerging from the bale chamber 24.

In the home, bale receiving position, the receiving platform 30 rests on a support 76 which includes a square tube 77 and a guide 78. The forward end of the tube 77 is bolted to the bale chamber 24 and extends rearwardly therefrom terminating at the rearward extremity of the platform 30. The guide 78 secured to the tube 77 projects laterally therefrom and is disposed in an underlying relation to the member 66. The tube 77 is positioned adjacent the platform 30 and serves to properly orient the platform 30 upon returning to its home position. To facilitate the return of the platform 30, the guide has a downturned portion 79.

In order that a bale carried by the receiving platform 30 be properly aligned with the rollers 57 and 58, the cylinder 70 is secured to the underside of the bale chamber 24 by means of an assembly 81 which automatically compensates for misalignment of the baler 21 and the table 22. As illustrated in FIG. 6, the assembly 81 comprises a sleeve 82 and a rod 83 slidably mounted in the sleeve 82. The sleeve 82 and rod 83 are complementary formed in the shape of a square so that angular alignment is maintained at all times. Affixed to the sleeve 82 is a collar 85 which is mounted on a pin 86 depending from the underside of the bale chamber 24.

The rod 83 projects on either side of the sleeve and carries at one end a bracket 84 to which is pinned the hydraulic cylinder 70. The bracket 84 is urged against the sleeve 82 by means of a compression spring 87. Now, when hydraulic flow is directed to the rod end of a cylinder 70, the piston rod 71 retracts until a bale carried by the platform 30 engages the rollers 57 and 58. Further flow to the cylinder 70 moves the cylinder 70 along the rod 71 compressing the spring 87. Thus, it will be appreciated that the platform 30 may be pivoted through a wide range because of the overriding effect of the assembly 81. Furthermore, the assembly maintains a positive force on the bale to insure constant frictional engagement between the bale and the rollers 57 and 58. The continuously rotating rollers 57 and 58 transfers the bale from the receiving platform 30 onto the aligned elevating platform 32.

Elevating Platform 32 (FIGS. 2, 7, and 8)

The elevating platform 32 is disposed outside the lateral extent of the table 22 and functions to receive bales from the receiving platform 30, to elevate the bales to the height of the table 22, and to discharge the elevated bales thereon. The platform 32 is L-shaped in cross section having a horizontal plate member 89 and an upright wall 90. The horizontal member 89 is elongate having its major axis disposed transverse to the direction of movement of the vehicle and is aligned with the receiving platform 30 to receive a bale endwise thereon. The platform 32 is mounted on a frame structure 91 which in turn is pivotally mounted on the extension frame 56 by means of a journal connection 92. The journal connection 92 provides a horizontal pivot axis for the elevating platform 32. A hydraulic cylinder 93 anchored to the extension frame 56 by a bracket 94 has a piston rod 95 connected to an arm 96 integrally formed with the frame structure 91 so that upon extension of the piston rod 95 the platform 32 is pivoted about the axis defined by the connection 92 from a lower position (solid line position of FIG. 7) to an elevated position (broken line position). A roller 98 mounted on the wall 90 and rotatable about an axis which lies generally in the plane of the wall 90 provides the means for transferring the bale onto the front portion 45 of platform 40. The roller 98, continuously driven by a motor 98a, does not impart a force on the bale with the platform 32 in the lower position. As the platform 32 is pivoted about the connection 92, the upright wall 90 assumes a horizontal position wherein the bale engages the roller 98 which frictionally drives the bale toward the platform 40. A guide 97 depending from the table 22 prevents premature movement of the bale until the platform 32 has assumed the fully elevated position.

Thus, it will be appreciated that the elevating platform 32 operates to deliver and deposit a bale crosswise of table 22 in the frontal area designated as 45.

Pusher Assembly 33 (FIGS. 1, 3, and 13)

The pusher assembly 33 is a slidably mounted on the frame 48 by means of a pair of laterally spaced rods 100 and 101. The rods 100, 101 are telescopically movable in companion tubes 102 and 103 which are secured to the channels 48, 48. The rods 100,102 and tubes 102,103 are disposed below the platform 40 with the rods 100 and 101 extending forwardly of their respective tubes 102,103. The rods 100 and 101 terminate at a point adjacent the forward margin of the platform 40. Secured to these forward ends and projecting upwardly therefrom are hollow, upright posts 104 and 105. The lower ends of the posts 104 and 105 are joined by a crossbar 106.

The posts 104 and 105 provide supports for pivot rods 107 and 108 respectively. The pivot rods 107 and 108 extend concentrically through their respective posts and present projections at either end thereof. To the upper projection of each of the pivot rods 107 and 108 is affixed an inner arm, 109 for rod 107 and 110 for rod 108 (see FIGS. 9 and 13). Secured to the upper end of each post 104 and 015 is an outer arm, 111 for post 104 and 112 for post 105. In the normal position of the assembly 33, the arms 109, 110, 111, and 112 form generally a straight line which extends parallel to, but vertically spaced from the frontal area 45 of the platform 40.

A hydraulic cylinder 113, mounted on the frame 48 and extending parallel to and intermediate the two support tubes 102 and 103, provides the means for actuating the pusher assembly 33. The cylinder 113 includes a piston rod 114 having its forward end secured to the midpoint of the crossbar 106. Retraction of the piston rod moves the arms 109—112 as a unit rearwardly across the platform 40 with the posts 104 and 105 passing through aligned slots 115 and 116 formed in the platform 40 (see FIG. 10). Actuation of the cylinder 113 moves the assembly with the arms 109—112 maintaining their normal in-line attitude.

The pivot rods 107 and 108 project below the lower extremity of their companion posts 104 and 105. Affixed to these lower projections are members 117 and 118 which are joined by a tie rod 119. Pivot rod 107 has another member 120 secured to the lower projection. The outer end of member 120 is attached to a hydraulic cylinder 121. The cylinder 121 is carried by a bracket 121a which is secured to the rod 100 so that cylinder 121 moves with the rod. Actuation of the cylinder 121 pivots the inner arms 109 and 110 about their respective pivot axes approximately 90°, the arm 109 pivoting counterclockwise and the arm 110 pivoting clockwise as viewed in FIG. 9. In the pivoted position, the inner arms 109 and 110 form right angles with their respective outer arms 111 and 112.

Controls (FIG. 12)

As shown schematically in FIG. 12, each of the cylinders 52, 70, 93, 113, and 121 is connected in circuit with an associated directional valve designated as 52a, 70a, 93a, 113a, and 121a, respectively. The hydraulic circuit for actuating the cylinders may be provided by the hydraulic system of the tractor used to tow the baler. As illustrated, one leg of the system is used to actuate the hydraulic cylinders which are connected in parallel and another leg is used to drive the hydraulic motors which power the rollers 57, 58, 59, and 98. In order to make the system completely automatic, the directional valves must be actuably responsive to a predetermined condition. Directional valves 70a, 93a, 113a, and 121a are actuated by mechanical trips located in the path of bale movement whereas valve 52a is actuated by a mechanical counter. Actuation of each of the cylinders will be considered separately.

The directional valve 70a actuating the receiving platform cylinder 70 is mounted on the upright wall 67 and is actuably connected to a pedal 123 which is pivotally mounted on platform 30 and disposed in the path of the bale as it emerges from the bale chamber 24 onto the platform 30 (see FIG. 1). As the bale engages the lever 123, the weight of the bale overcomes the resistance of spring 124 shifting the directional valve 70a, directing hydraulic flow to the cylinder 70. This causes the piston rod 71 to be retracted which in turn pivots the platform 30 to the bale delivery position. Now, as the bale is transferred from the platform 30 to the elevating platform 32, it clears the lever 123 allowing a bias spring 124 to shift the spool in valve 70a beyond its neutral position. This reverses flow to the cylinder 70 causing the platform 30 to return to its home position. Slant surface 123a depresses lever 123, which recenters valve 70a.

The spring-biased pedal 123 provides the additional function of automatically rejected untied bales which would adversely effect the stability of the final ground deposited stack. The spring force of spring 124 is selected so as to yield under the force of a bound bale resting on the pedal 123, but not to yield under the force of an individual hay charge or vertical segment which makes up the bale (see FIG. 1). Thus, it will be understood that an untied bale will be forced rearwardly over the tilted pedal 123 by a succeeding bale emerging from the bale chamber 24 and discharged onto the ground.

The directional valve 93a associated with the pivot cylinder 93 of the elevating platform 32 is mounted at the outermost extremity of the upright wall 90 (see FIGS. 7 and 8). A pedal 126 disposed on the platform 30 in the path of bale movement is depressed by a bale engagement thereof causing the spool to shift in the directional valve 93a. This directs hydraulic flow to the cylinder 93 causing the piston rod 95 to extend which pivots the platform 30 to the elevated position. The pedal 126 is connected to a front pedal 125 by a rod 127 which becomes operative with the platform 32 in the upended position and prevents the shifting of the spool valve 93a until the bale carried thereon has been deposited on the platform 40. Upon clearing the front pedal 125, a return spring 128 shifts the spool valve 93a beyond its neutral position, to reverse hydraulic flow to the cylinder 93 causing the platform 32 to return to its home position. Slant surface 125a, attached to a frame member reacts with an arm attached to lever 125 to recenter valve 93a.

A trip 129 disposed at the far side of platform 40 opposite the bale-receiving side is actuated by a bale engagement thereupon which occurs when two bales are received on the platform 40. The trip 129 shifts the spool valve 113a by a mechanical linkage (not shown) which directs hydraulic flow to the cylinder 113 causing the pusher assembly 33 to move rearwardly. The pusher assembly 33 moves the two-bale row rearwardly, clearing the trip 129. The spring-loaded trip 129 shifts the spool valve 113a reversing hydraulic flow to the cylinder 113. This returns the pusher assembly 33 to its home position.

In the situation where a keyed layer is to be formed, an auxiliary circuit which includes the cylinder 121 and its associated directional valve 121a is activated. This may be done manually or by any suitable mechanical means such as a ratchet-type counter wheel. In the auxiliary circuit the cylinders 113 and 121 are connected in parallel. Now when a bale actuates the trip 129, hydraulic flow is directed simultaneously to the two cylinders 113 and 121 so that the cylinder having less resistance is completely extended before the other begins extending. Since transposing the bale from a crosswise to a longitudinal disposition on the table (see FIG. 9) requires less force than moving the two-bale row rearwardly, cylinder 121 is first actuated. At the completion of the stroke of cylinder 121, hydraulic flow is directed to cylinder 113 whose stroke drives the pusher assembly 33 rearwardly.

As best seen in FIG. 13, a second trip 130 which normally is depressed below the surface of the platform 40 is next moved through a slot 135 in platform 40 to its operative position presenting a portion extending above the surface and in the path of the bale movement at a point adjacent the post 104. Pedal 130 is operatively connected to trip 129 through arm 136 and is urged upwardly by spring 137. The pedal 130 is maintained in the depressed position (solid line position) by mechanical holding means (not shown). Releasing of the holding means which may be effected by a conventional linkage causes the pedal 130 to move to its operative position (broken line position). Now as a bale engages the inner pedal 130, the pusher assembly 33 is actuated through operation of arm 136 moving the bale rearwardly between the two transposed bales. It should be understood that the selective actuation of the auxiliary circuit and the movement of the inner pedal 130 to its operative position may be accomplished by a variety of mechanical linkages but for purposes of simplicity and brevity, their description was not included herein.

After a layer is completed which may be determined by a conventional ratchet counter, the directional valve 52a may be manually actuated directing fluid to the hydraulic cylinder 52 which extends the piston rod 65 moving the platform 40 to its upended position. This deposits the layer on the transport unit bed and actuates a control linkage comprising a strap 131 and lever 132 mounted on platform 40 (see FIG. 1). This reverses the direction of flow to the cylinder 52 thereby returning the platform 40 to its home position. A slant surface 133 engaging a pin projection 134 on lever 132 returns the valve 52a to the neutral position.

OPERATION

With the transport unit 23 connected to the layer-forming table 22 and the baler 21 and with the platforms 30, 32, and 40 in their respective home positions, the baler-bale wagon combination is towed through the windrowed field. As shown in FIG. 1, bales of hay are forced through the bale chamber discharge 26 onto the receiving platform 30. As the bale B-1 is pushed clear of the bale chamber 24 by a succeeding bale B-2, the front edge of the emerging bale trips pedal 123 which shifts the spool valve 70a directing hydraulic flow to the pivot cylinder 70. The platform 30 is pivoted to the bale delivery position of FIG. 2 wherein the leading longitudinal side of the bale B-1 carried thereby engages the rollers 57 and 58. The continuously rotating rollers 57 and 58 transfer the bale B-1 onto the aligned elevating platform 32. As the bale B-1 clears the platform 30, the spring-loaded pedal 123 returns beyond its normal position shifting the spool valve 70a. This reverses hydraulic flow to the pivot cylinder 70 causing the platform 30 to return to the home position, which recenters valve 70a.

Meanwhile the bale B-1 trips pedal 126 of platform 32 thereby shifting the spool valve 93a (see FIGS. 7 and 8), which directs hydraulic flow to the elevating cylinder 93. The platform 32 is pivoted about the pivot axis 92 to the elevated position wherein the bale B-1 confronts the frontal portion 45 of platform 40 and rests upon roller 98. The roller 98 transfers the bale B-1 onto the platform 40. The platform roller 59 disposed in the path of the bale B-1 discharged from the elevating platform 32 engages the bale and moves it laterally across the platform 40 to a position laterally spaced from trip 129. The succeeding bale B-2 is similarly transferred to the platform 40, and upon being deposited thereon completes a two-bale row on the frontal portion 45. The bale B-2, driven laterally across the platform 40 by the action of roller 59, pushes bale B-1 into engagement with pedal 129. This actuates the pusher assembly cylinder 113. Retraction of the piston rod 114 brings the arms 109—112 into engagement with the longitudinal side of the row comprising bales B-1 and B-2. The row is thusly moved rearwardly along platform 40 until the leading end of bale B-1 clears the spring-loaded pedal 129. The pedal 129 returns beyond its normal position shifting the spool valve 113a to reverse flow to the cylinder 113. Extension of the piston rod 114 returns the assembly 33 to its home position, which recenters the valve.

The loading procedure is repeated until a four-row, eight-bale layer is accumulated on the platform 40. The tilt cylinder 52 is next manually actuated, pivoting the platform 40 about the pin connection 62. The platform 40 is moved to a generally vertical position and the layer is deposited as a vertical tier on the transport unit 23. After a load comprising a series of vertical tiers is accumulated on the transfer unit 23, the pin of clevis 29 is removed and the pins 43, 43 are withdrawn from their respective brackets thereby freeing the loaded transport unit for independent movement to the storage area. Prior to disconnection, a rod 140 (shown in phantom in FIG. 1) permanently secured to the baler 21 is attached to the table 22 and the U-frame 39 is pinned to the T-shaped member 35 through openings 136, 136 (see FIG. 3). Meanwhile another transport unit may be connected to the table 22 and the baler 21 so that the baling operation may be continued.

If it is desired to form a layer having bales disposed in a crosstied relation with adjacent bales of another layer, the auxiliary circuit comprising the pivot arm cylinder 121 is actuated. It should be pointed out that the use of the crosstied position contemplates that the transport unit 23 includes means for mechanically depositing the load on the ground wherein the vertical tiers on the transport unit, assume a horizontal attitude on the ground.

As before, the first two bales B-1 and B-2 form a two-bale row on the frontal portion 45 of platform 40. With the bales so situated, the cylinders 113 and 121, arranged in tandem, are actuated. Cylinder 121 is first moved through its full stroke causing the inner arms 109 and 110 to pivot about their respective posts 104 and 105. As illustrated in FIG. 9, pivotal movement of the arms 109 and 110 angularly displaces the bales B-1 and B-2 90° in diverging directions. In the pivoted position the bales are arranged parallel to one another and separated by a space slightly greater than one bale length. At the completion of the stroke of cylinder 121, cylinder 113 begins moving, causing the two bales to be moved rearwardly by the outer pusher arms 111 and 112. As shown in FIG. 10, the bales B-1 and B-2 are moved rearwardly along platform 40 to a position clear of frontal portion 45.

The intermediate pedal 130 is next moved to its operative position. The two succeeding bales B-3 and B-4 are one at a time moved by actuation of the rollers 59 to trip the pedal 130. This actuates the pusher assembly 33 to move each bale rearwardly along platform 40 in the space separating the two parallel bales B-1 and B-2. The final four bales are accumulated in the manner discussed above completing the layer formed in the pattern depicted in FIG. 11.

By selectively energizing the auxiliary circuit which includes the cylinder 121, the crosstied layer may be formed and deposited at any position in the series which makes up the entire load.

Although this preferred embodiment has been described in particular detail, it should be emphasized that modifications and alterations may be made therein without departing from the scope and spirit of the invention as set forth in the appended claims.

What I claim is:

1. An attachment for use with a baler of the type having a longitudinally extending bale chamber including a bale discharge, said attachment comprising:
    a table supported by said baler;
    transfer means for individually receiving bales discharged from said baler and moving said bales onto said table;
    means on said table for arranging bales received thereon into a layer according to a predetermined pattern; and
    means for discharging said layer intact from said table,
    said means for arranging bales including a first means for moving bales laterally on said table, a second means for moving bales rearwardly on said table, and a third means for angularly displacing bales about an axis normal to said table, said first, second, and third means being selectively and sequentially operable to form a layer of bales in a predetermined pattern.

2. The attachment as recited in claim 1 wherein said first means is operative upon said bales received on said table to form a row of bales arranged in end-to-end relation, said second means includes a first pusher operative to move said row rearwardly on said table, and said third transfer means includes a second pusher cooperatively arranged with said first pusher for angularly displacing individual bales of said row and for moving said displaced bales rearwardly on said table.

3. The attachment as recited in claim 1 wherein said first means includes means to form a row of two bales arranged in end-to-end relation, said second means includes a pair of pushers aligned to engage a longitudinal side of said row for moving said row rearwardly on said table, and said third means includes a pair of arms cooperatively arranged with said pair of pushers to sequentially angularly displace said two bales in diverging directions on said table from a substantially aligned relationship to a parallel and laterally spaced relationship and to move said parallel and laterally spaced bales rearwardly, and said arranging means further includes means for positioning bales between said laterally spaced bales.

4. An attachment for use with a baler of the type having a longitudinally extending bale chamber including a bale discharge, said attachment comprising:
   a table supported by said baler and having a portion disposed above said bale discharge, said portion extending laterally from at least one side of said bale chamber;
   a first transfer means for individually receiving bales from said bale discharge, and for moving said received bale laterally to a position removed from the lateral extent of said portion of said table;
   a second transfer means for lifting said bale from said removed position and depositing said bale onto said portion of said table;
   a third transfer means on said table for arranging bales deposited into a layer according to a predetermined pattern; and
   means for discharging said layer intact from said table.

5. The attachment as recited in claim 4 wherein
   said first and second transfer means include first and second platforms, respectively, said first platform being aligned to receive bales discharged from said bale chamber, said second platform being situated outside the lateral extent of said table, said first platform being pivotable to align with said second platform, said second platform being movable vertically to a position elevated to at least the level of said table, and each of said platforms including power means for moving bales relative thereto,
   means for sequentially operating said movement of said first and second platforms whereby each bale discharged from said bale chamber is moved first laterally, then vertically and finally laterally onto said table.

6. A device for transferring bales discharged from a longitudinally extending bale chamber of a baler to a table of an associated bale-accumulating mechanism, said table disposed over portions of said bale chamber and extending laterally from at least one side of said bale chamber;
   a receiving platform aligned with said bale chamber for receiving bales discharged therefrom;
   means for moving a bale received on said platform to a position removed from the lateral extent of said table;
   means for lifting said removed bale to an elevated position, the elevation of which being at least equal to that of said table, and including transfer means for moving said bale in said elevated position onto said table.

7. The device as recited in claim 6 wherein
   said receiving platform is pivotally mounted on said bale chamber, and
   said means for moving said bale to said removed position includes power means for pivotally moving said platform to a position rearwardly and laterally removed from said bale chamber, and elevating platform aligned with said platform in said removed position, power means for forcing said bale from said receiving platform to said elevating platform; and
   said means for lifting said removed bale includes power means for elevating said elevating platform to an elevation equal at least to that of said table.

8. The device as recited in claim 7 wherein said elevating platform is pivotable about a horizontal axis,
   said elevating platform including two rectangularly disposed sides, one of said sides being horizontally oriented in said lower position and vertically oriented in said upper position, said one side adapted to receive a bale in said horizontal disposition, the other of said sides being disposed vertically in said lower position and horizontally in said upper position,
   said power means adapted to pivotally move said elevating platform about said horizontal axis to said elevated position whereby a bale is being elevated by pivotal movement of said elevating platform is transferred from said one side to said other side, and said transfer means being operatively responsive to a bale being transferred to said other side.